Dec. 1, 1936.  M. A. WEST  2,062,383
SCREW AND SCREW DRIVER FOR THE SAME
Filed March 1, 1933
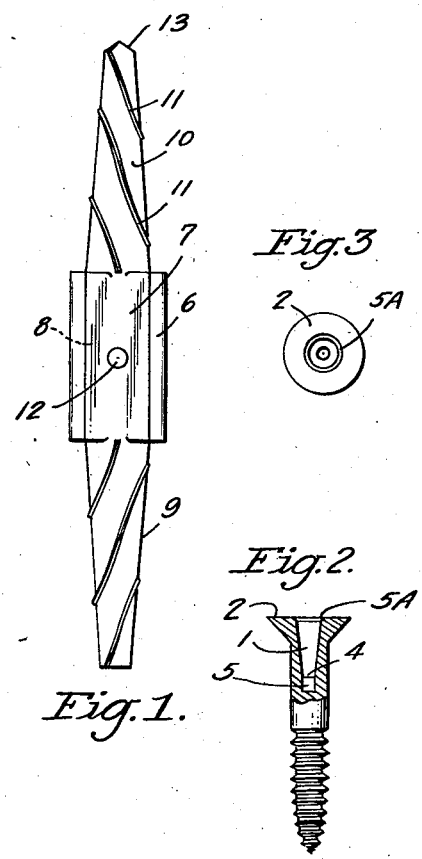
Inventor
Maxwell A. West
Thomas Bilyeu
Attorney Patented Dec. 1, 1936

2,062,383

UNITED STATES PATENT OFFICE 2,062,383

SCREW AND SCREW DRIVER FOR THE SAME

Maxwell A. West, Portland, Oreg.

Application March 1, 1933, Serial No. 659,070

3 Claims. (Cl. 85—45)

The body of the screw has a thread disposed upon its outer periphery and between the head and the point. The head is disposed upon one end of the body element of the screw. A hole is disposed longitudinally of the body of the screw and extends through the head of the screw. The center line of the hole has an axial center line common with that of the screw. The side wall of the outer portion of the hole converges inwardly to form a frustro-conical depression decreasing in diameter from its outer end to a point adjacent its inner end. The extreme inner end of the hole is cylindrical and extends substantially beyond the frustro-conical depression, with which it is coaxial and contiguous.

The screw driver comprises a driving head having a supporting handle therefor not shown. The primary outer surfaces of the driving head are frustro-conical in shape, and have a taper similar to that of the frustro-conical depression disposed within the screw. The driving head has a plurality of V-shaped projections disposed upon the outer surfaces of its tapered portions.

The driving head is adapted for being hinged relative to the supporting handle of the screw driver, and may be used either with its longitudinal center line disposed at a right angle with that of the screw driver shank or with the longitudinal center lines coaxial.

My new and improved screw driver is adapted placing wood screws, machine screws, lag screws, stove bolts and other threaded members that commonly have a screw driver receiving slot diametrically disposed across the head thereof.

My new and improved screw driver is adapted for use in conjunction with my new and improved screws.

I provide driving projections disposed upon the conical surfaces of the driving head, and extending therefrom about one one-hundredth of an inch. The driving head is purposely made of material substantially harder than that of which the screw is made in order that the projections may be made to embed themselves within the wall of the tapered hole disposed therein.

When helically disposed projections are provided on the conical surfaces of the driving head, I provide a right hand helix on one surface and a left hand helix upon the other surface. The right hand helix is used for driving screws having right hand threads and the left hand helix is used for removing such screws. For screws provided with left hand threads the order is reversed.

The engagement between the screw and its driver is effected by the friction between the complementary tapered surfaces thereof, the force of the initial contact being augmented by the coaxial displacement of the two members toward each other effected by the wedging action developed by the helical projections which have embedded themselves within the walls of the screw and which, upon the relative rotation of the two members, tend to draw them together. When the screw has been driven home, a slight reverse movement of the driver tends to release the projections from their embedded positions, forcing the members apart coaxially and freeing them.

The driver head is prevented from bottoming in the screw by the provision of the cylindrical termination to the frustro-conical depression therein.

To facilitate the removal of screws after the opening therein may have been filled with paint, putty, or the like, I provide, upon the extreme ends of the driving head, a drill point suitable for penetrating such matter.

By maintaining a uniform taper of the frustro-conical depression through the range of screw sizes, it is readily apparent that a single driver can be made to fit screws of a number of different sizes. In other words the range of driver sizes may be encompassed in fewer tools than required by the conventional type of screw.

One object of my invention is to provide means for driving screws so that the screw may be driven and removed repeatedly without deforming the screw head.

Another object of my invention is to provide means whereby the permissible driving torque imposed upon the screw by the driver may be augmented over that possible with present types.

A still further object of my invention is to provide a screw driver and screw that may be conjointly used for driving the screw and for removing it from its placement.

A still further object of my invention consists in providing an instrument that may be used upon wood screws, metal screws, stove bolts and the like with equal facility.

A still further object of my invention consists in so constructing the screw that a minimum of material will be required in its manufacture.

A still further object of my invention consists in so constructing the screw that fewer operations are required in making it, it being possible to form the depression within the screw head at the time of forming the head.

A still further object of my invention consists in so constructing the screw that there is small likelihood of the head of the screw being destroyed.

A still further object of my invention consists in so constructing a wood screw that it may be driven home without advance preparation of the wood into which the same is to be forced.

A still further object of my invention consists in constructing a screw and driver therefor, through the combined use of which the screw may be ratcheted into placement as in restricted locations.

A still further object of my invention consists in so constructing the device that it may be operated without danger of the screw driver point slipping out of place and marring the material being worked upon.

A still further object of my invention consists in so constructing the device that it may be used with facility in the placing and removing of screws in locations difficult of access with screws of conventional type.

With these and incidental objects in view, the invention consists in certain novel features of construction and combination of parts, the essential elements of which are set forth in the appended claims, and a preferred form of embodiment of which is hereinafter shown with reference to the drawing which accompanies and forms a part of this specification.

In the drawing:

Fig. 1 is an enlarged side view of a driving head adapted to coact with my improved screw.

Fig. 2 is a fragmentary sectional side view of the head end of a screw, illustrating the construction of the driving hole disposed therein.

Fig. 3 is a plan view of the screw illustrated in Fig. 2.

Like reference characters refer to like parts throughout the several views.

I form a tapering hole 1 longitudinally of the body of the screw and extend the same inwardly from the outer surface 2 of the head of the screw. The center line of the tapering hole 1 is coaxial with the longitudinal center line of the screw. The hole uniformly decreases in diameter from its outer end 3 to its inner end 4. A cylindrical recess 5 extends inwardly from the minor diameter 4 of the tapering hole. This hole may be formed by drilling, swaging or punching, and is preferably formed at the time the screw is formed. For screws that are to be driven and removed repeatedly, the tops of which are to remain free from burrs, a shallow countersink 5A may be disposed about the major diameter of the tapered hole.

The screw is preferably actuated by and through the use of a double ended driving head 6. The double ended driving head 6 has a central portion that is flattened upon its oppositely disposed sides as illustrated at 7 and 8, for actuation by suitable driving means not here shown, and may be provided with a ball snap 12 for retention therein. The driving head has uniformly tapering ends 9 and 10. The slope of the uniformly tapering ends is substantially equal to the slope of the tapering side walls of the hole disposed within the outer end of the screw. Spaced ribs 11 are disposed upon the outer tapering surfaces of the oppositely disposed ends of the double ended driving head. One of the ends of the driving head has the ribs disposed therearound in the form of a right hand spiral, while the ribs upon the opposite end are disposed therearound in the form of a left hand spiral, in order to facilitate rotation of the screw in the direction desired.

A fluted drill point 13 may be provided on an end of the driving head to facilitate the removal of lacquer, paint, or the like from the holes in screws to be removed, over which such finishes may have been applied.

While I have here shown the hole within the screw as having inwardly extending tapered side walls for the major portion of its length and having a cylindrical portion extending beyond the apex of the tapered side walls, I do not wish to be limited to a construction of this type as it is apparent that if the driving head for driving the screw has a tapered side wall and that the driving head is so arranged that the point of the driving head will not reach to the bottom of the tapered hole, that equally satisfactory results may be obtained and therefore, I do not wish to be limited to the screw having the combination of a frustroconical and cylindrical hole having a common axial center line with the screw.

What I claim is:

1. A new article of manufacture comprising a body member having a helical thread disposed about its outer surface and provided at one end with a head, the head having disposed therethrough a hole coaxial with the body member, said hole comprising a shallow countersink, followed by a frusto-conical portion adapted for engagement by a tool and terminating in a cylindrical portion, said cylindrical portion affording clearance for the point of the tool.

2. A new article of manufacture comprising a body member having a helical thread disposed about its outer surface and terminating in a point at one end and a head at the other, the head having therein a hole coaxial with the body member, said hole comprising a frusto-conical portion having sharply converging sides followed by a frusto-conical portion having gradually converging sides, said gradually converging sides being engaged by a tool and terminating in a cylindrical tool point clearance portion.

3. A screw having an axial socket of substantial length extending through its head and into its shank, the socket for the greater portion of its length being conical in shape and the walls of the socket being smooth throughout the length of the socket and adapted to be engaged by a tapered driving tool when inserted within the socket, the socket terminating in a nontapering recess at its inner end to afford clearance for the point of the tool, the entrance to the socket being substantially circular and terminating at all points in spaced relation to the peripheral edge of the screw head.

MAXWELL A. WEST.